(12) United States Patent
Gercekci et al.

(10) Patent No.: US 6,354,500 B1
(45) Date of Patent: Mar. 12, 2002

(54) METHOD FOR COMMUNICATING WITH A PLURALITY OF CONTACTLESS DATA CARRIERS AND CONTACTLESS DATA CARRIER FOR USE THEREIN

(75) Inventors: Anil Gercekci, Bellevue (CH); Paul De Champs, Ferney Voltaire (FR)

(73) Assignee: Atmel Research, Georgetown (GC)

( * ) Notice: Subject to any disclaimer, the term of this patent is extended or adjusted under 35 U.S.C. 154(b) by 0 days.

(21) Appl. No.: 09/308,605

(22) PCT Filed: Nov. 3, 1997

(86) PCT No.: PCT/EP97/06167

§ 371 Date: Sep. 2, 1999

§ 102(e) Date: Sep. 2, 1999

(87) PCT Pub. No.: WO98/22903

PCT Pub. Date: May 28, 1998

(30) Foreign Application Priority Data

Nov. 21, 1996 (GB) .............................. 9624216

(51) Int. Cl.$^7$ .............................. G06K 7/08; H04Q 5/22
(52) U.S. Cl. ................. 235/451; 235/492; 235/487; 340/10.1; 340/10.2; 340/10.33; 340/10.34
(58) Field of Search ............................... 235/492, 451, 235/375, 379–384, 487; 340/10.1–10.6

(56) References Cited

U.S. PATENT DOCUMENTS

| | | | | |
|---|---|---|---|---|
| 5,003,594 A | * | 3/1991 | Shinagawa | 380/24 |
| 5,202,838 A | * | 4/1993 | Inoue | 702/57 |
| 5,517,074 A | * | 5/1996 | Iijima | 235/492 |
| 5,521,590 A | * | 5/1996 | Hanaoka et al. | 713/159 |
| 5,539,394 A | * | 7/1996 | Cato et al. | 340/10.32 |
| 5,698,637 A | * | 12/1997 | Furuta | 235/492 |
| 5,936,540 A | * | 8/1999 | Lebet | 340/825.07 |
| 5,940,006 A | * | 8/1999 | MacLellan et al. | 340/825.54 |
| 6,010,075 A | * | 1/2000 | Ishifuji et al. | 235/492 |
| 6,034,603 A | * | 3/2000 | Steeves | 340/572.1 |
| 6,118,789 A | * | 9/2000 | Wood, Jr. | 370/462 |

FOREIGN PATENT DOCUMENTS

| | | |
|---|---|---|
| EP | 553905 A1 | 4/1993 |
| GB | 2116808 A | 9/1983 |
| WO | WO93/23767 | 11/1993 |

* cited by examiner

Primary Examiner—Michael G. Lee
Assistant Examiner—Jamara A. Franklin
(74) Attorney, Agent, or Firm—Thomas Schneck; John P. McGuire, Jr.

(57) ABSTRACT

A method of communicating with a plurality of contactless data carriers and a contactless data carrier for use in communicating with a base station. The method of communicating includes the base station transmitting a wake up signal for a plurality of contactless data carriers which are in a wait state. Then, the data carriers exit the wait state and transmit identity information to the base station in a time slot that is randomly self-assigned. The base station registers the identity information by polling the registered data carriers and initiates dialogue with registered data carriers in an order determined by the randomly self-assigned time slots of the registered data carriers. The method of communication helps to avoid the problem of data collision that often occurs when multiple contactless data carriers or smart cards operate in the field of a single base station or card reader.

10 Claims, 4 Drawing Sheets

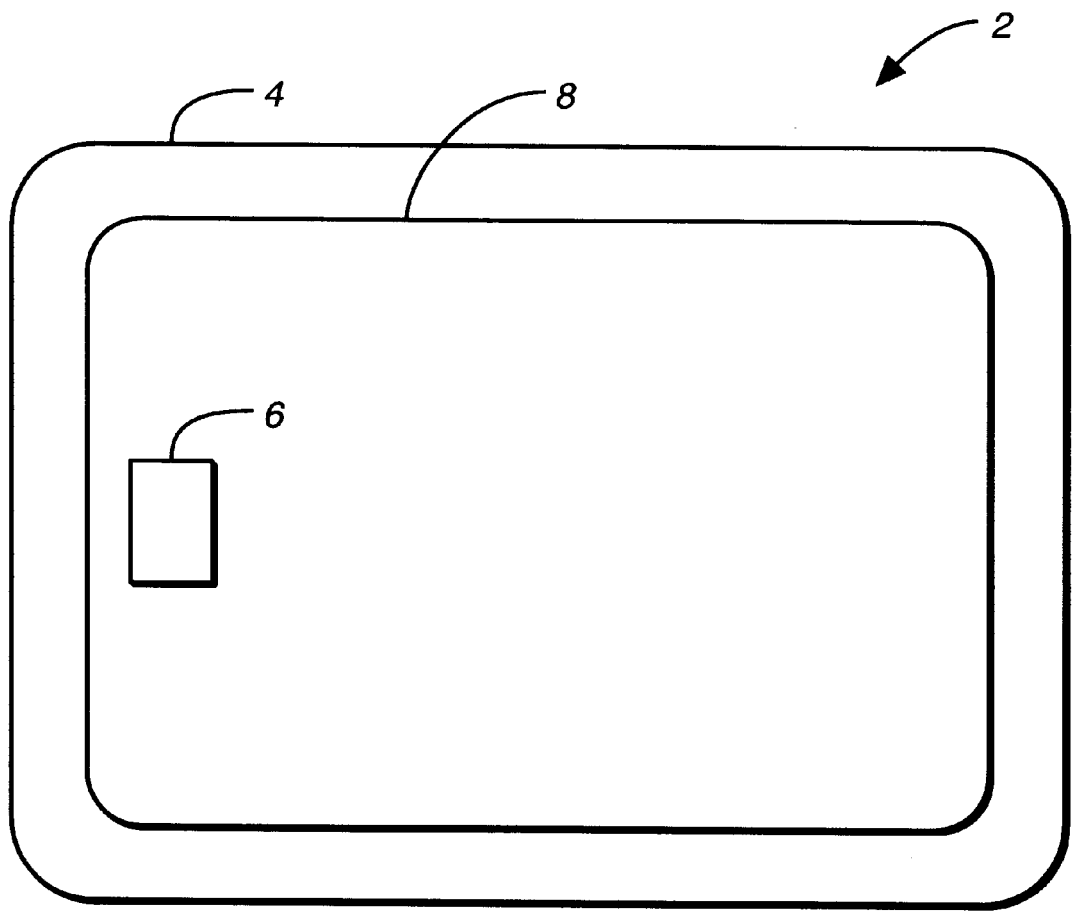
FIG._1

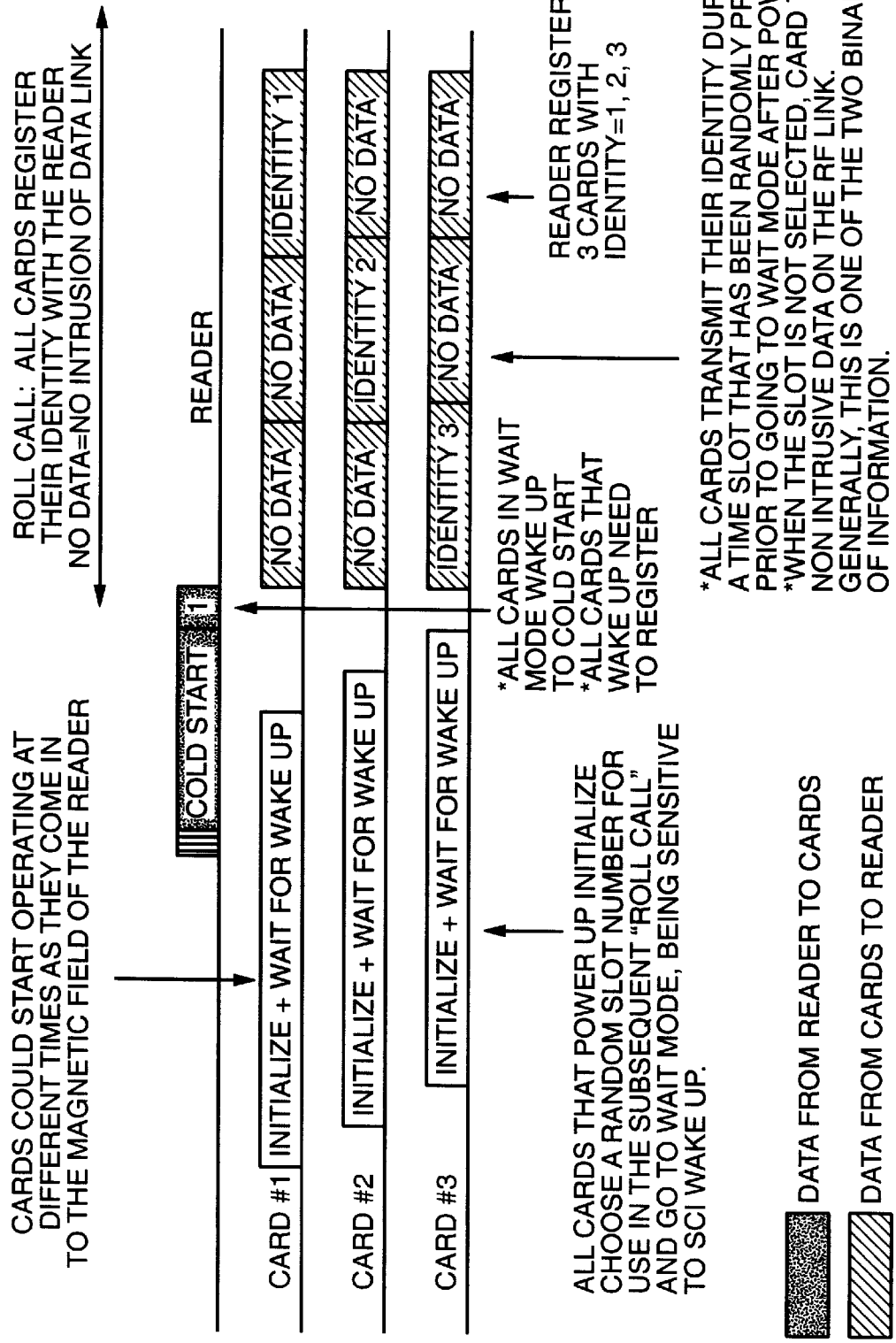
FIG._2

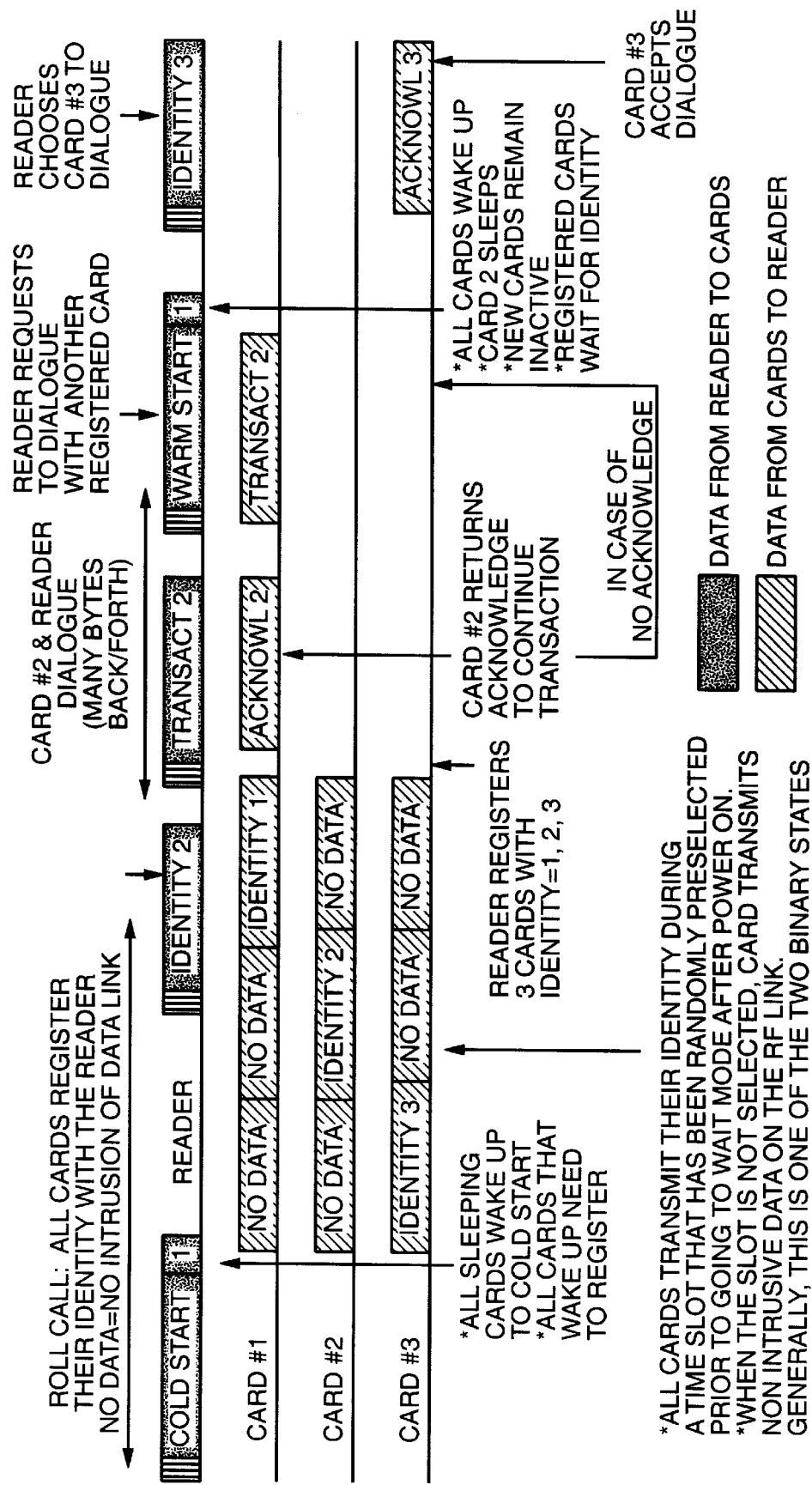
FIG._3

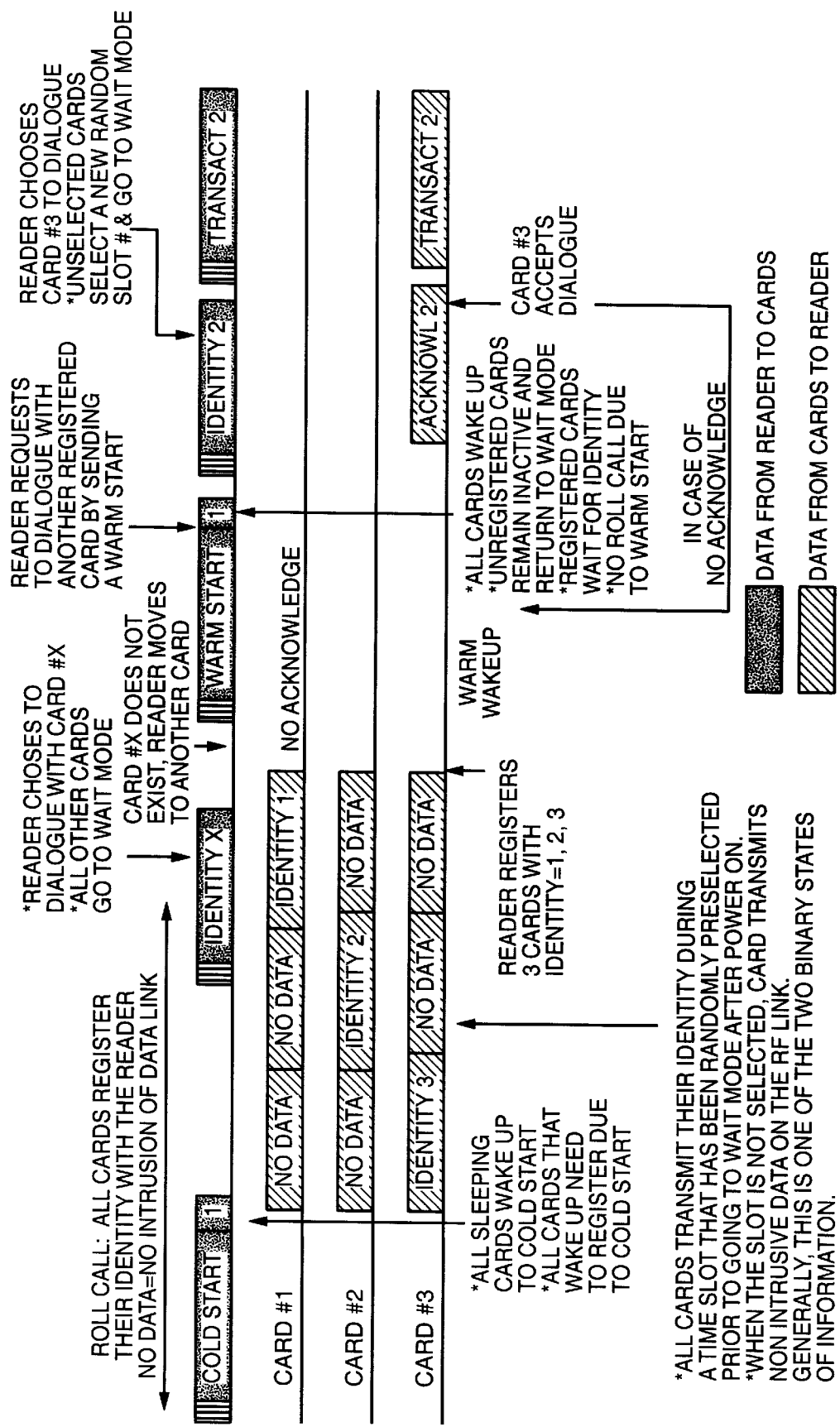
FIG._4

METHOD FOR COMMUNICATING WITH A PLURALITY OF CONTACTLESS DATA CARRIERS AND CONTACTLESS DATA CARRIER FOR USE THEREIN

FIELD OF THE INVENTION

This invention relates to contactless data carriers such as smart cards. Contactless smart cards are portable data carriers which contain an integrated circuit and which are capable of establishing a contactless or wireless communication dialogue with a reader.

BACKGROUND OF THE INVENTION

In contactless smart card applications, a problem to be solved is the likely collision of information sent back to a single common reader by multiple smart cards which the magnetic field generated by the reader for powering the smart cards and for providing clock information thereto. Smart cards which use this power are likely to begin to "talk back" to the reader and, since the smart cards may not be aware of each others, existence while sending information back to the reader, this could result in data collision and hence the reader could receive erroneous messages from the smartcards.

Such a condition is likely to occur, for example, when a person's wallet or suitcase is waved over the reader. If the wallet contains more than one contactless smart card, then all those smart cards are likely to power up and begin to dialogue with reader in order to complete the desired transaction.

SUMMARY OF THE INVENTION

It is an object of the present invention to provide a method of communicating with a plurality of contactless data carriers wherein the above disadvantages nay be overcome or at least alleviated.

In accordance with a first aspect of the invention there is provided a method of communicating with a plurality of contactless data carriers as claimed in claim 1.

In accordance with a second aspect of the invention there is provided a contactless data carrier for use in communicating with a base station as claimed in claim 2.

BRIEF DESCRIPTION OF THE DRAWINGS

One method for communicating with a plurality of contactless data carriers and a contactless data carrier for use therein will now be described, by way of example only, with reference to the accompanying drawings, in which:

FIG. 1 shows a shows a contactless smart card incorporating features in accordance with the present invention;

FIG. 2 shows a timing diagram illustrating a method of synchronising contactless smart cards during power up;

FIG. 3 shows a timing diagram illustrating "roll call", with no collision, in the method of FIG. 1; and FIG. 4 shows a timing diagram illustrating "roll call", with collision occurring, in the method of FIG. 1.

DETAILED DESCRIPTION OF A PREFERRED EMBODIMENT

A new method of communicating with a plurality of contactless data carriers such as smart cards allows operation of multiple smart cards in the field of a single reader, while avoiding data collision by using a new anti-collision protocol. The protocol relies on the presence of certain software and/or hardware features, as described below.

Referring firstly to FIG. 1, a contactless smart card data carrier 2 is formed of a conventionally-sized plastic card 4, which encapsulates an integrated circuit microcontroller 6. An antenna 8 provides an interface between the card's microcontroller 6 and a card reader 8. The MCU 6 has the following features:

The IC is arranged to recover its power from an alternating magnetic field generated by the reader, and also to recover clock information for the MCU.

The MCU h as a serial communications interface (SCI) hardware or similar transmit and receive hardware. The SCI is able to receive and transmit information of a given size (which could be set by software, or fixed, depending on the hardware). In the preferred embodiment, the information packet is 9 bits long, the 9th bit being used to distinguish between two different types of message. During normal operation, a receive flag is set by the SCI and a corresponding interrupt routine can be executed when a message is received. The SCI has a detection capability for a certain type of message during reception. This message type, in this preferred embodiment, is indicated by the presence of a logical "1" in the 9th bit position of the information packet transmitted from the reader with this capability, the SCI can be put in a "wake up" mode, during which the receive data flag and corresponding interrupt will be inhibited until the "wake up" message is received, at which time the SCI will wake up the MCU.

The MCU has the ability to remain in a wait state with its clocks in a known state. In this state, the MCU does not execute instructions. However, the SCI remains operational and ready to receive data transmitted to it. When the MCU is woken up by the SCI, it is able to exit the wait mode and execute the SCI interrupt routine.

Referring now also to FIG. 2, FIG. 3 & FIG. 4, the above features are used in a protocol to synchronise all smart cards powered up by the reader as follows:

Any smart card which enters the magnetic field of the reader is powered up, which allows the smart card's MCU to initialise the IC.

When initialisation is completed, the IC turns on the "wake up" mode feature of the SCI, and then enters into the "wake up" mode by executing a wait instruction. While waiting in this mode, the SCI is capable of continuing to operate and receive information transmitted by the reader (or other contactless smart cards).

If the IC of the smart card in the waiting mode receives a logical "1" in the 9th bit position of the data stream received, then the MCU is woken up, the MCU begins to operate And the SCI interrupt subroutine is executed. However, if the received data stream does not contain a logical "1" in the 9th bit position, then the received data is discarded by the SCI and the MCU remains in the wait mode. Thus, the MCU does not establish a data link back to the reader unless it is woken up from its wait state by the special start up message.

There are at least two different types of start up message sent by the reader: the principal ones being "cold" start up or "warm" start up.

The "cold" start up is initiated when the reader is searching for any card that may enter its field. If this is the case, all the MCUs which are in the wait state react to this message and begin registering their identities with the reader. The "cold" start up message allows all those cards which are in the wait mode to come out of the wait mode in a synchronised manner.

In the case of a warm start up, the reader already has a list of registered cards and it decides to dialogue with a different pre-registered card.

The "cold" and "warm" start ups can be distinguished by the value in the byte of information in the received data stream which causes the start up (i.e., the 8 bits which precede the 9th (start up) bit). Even greater differentiation could be achieved within the warm/cold start up message, such as: performing a warm start up with a dialogue request with an individual card or broadcast request to all cards, resuming an interrupted dialogue, requesting feedback from all cards, etc.

The reader continually sends a cold start message in a cyclical fashion when it has completed dialogues with registered cards. The cards which completed their dialogues with the reader will avoid responding to the cold start message from the reader. New cards which may have just powered up or cards which could not dialogue during the previous cycle will now reply and hence the cycle begins again.

This protocol ensures that any contactless smart card entering the reader's field does not "talk" to the reader unless the wake up command has been received from the reader while the card is in the wait mode. At that instant, any MCU which wakes up is synchronised to the start up message received from the reader. This message serves as a sync signal for all cards which had been waiting for such information.

Once the MCUs which had been waiting in the wait mode have been woken up by the same received message, a polling protocol is used to distinguish the identity of the awoken smart cards. This is achieved by the use of a random self assignment of dialogue time slots during a "roll call" dialogue, during which the MCUs transmit their identities in a time slot which is determined by a random number generated by each MCU prior to "roll calls". This protocol relies on the statistical distribution of these random numbers in order to operate. If the protocol is arranged such that there are 16 time slots available during "roll call", the MCUs have to pick a random number between 1 and 16, etc.

The reader registers incoming identities of the responding awoken cards, and can then proceed to dialogue with each responding card on an individual basis, while other cards wait their turn by returning to the wait state ready to wake up to a warm start.

This individual dialogue proceeds as follows. Firstly, the reader resends the identity of a smart card registered during recall for reconfirmation. The card which recognises its identity number sends back an acknowledgement message.

If the reconfirmation occurs, the full transaction proceeds for that smart card. If the reconfirmation does not occur, this could be due to a card which has stopped operating or left the filed or a collision of identity information sent back to the reader by two or more different cards in the same time slot. During this period other cards which have responded to the "roll call" wait in the wait mode.

When the reader completes its dialogue with a chosen card, that card then shuts down for the remainder of the session (i.e., the remainder of time for which the reader's power filed is present). The reader then sends a warm start up message (containing a logical "1" in the 9th bit position), but this time with data in the preceding 8 bits which is different than for the initial cold start message. In this way all cards will wake up, but only those which had already completed their "roll call" will remain active for a subsequent identity "inquiry" from the reader. This process continues until the reader has completed dialogue with all the cards which registered during "roll call". Those cards which missed the cold start message will continue to refrain from dialogue with the reader until the next cold start message which the reader sends.

In the event that two or more cards select the same random "roll call" time slot, this could cause a data collision and the identity number received by the reader may not be that of any of the colliding cards which were transmitting during that time slot (all 1's and all 0's being excluded identity numbers). If the identity is not distorted due to a collision, then the reader proceeds to dialogue with the cards as they are registered. If the identity is distorted due to a collision, the reader will attempt to dialogue with a non-existent card and so will not receive an acknowledgement during the reconfirmation process.

Hence, those cards which do not get to "talk" to the reader due to a distorted-identity registration will choose a new random time slot and wait for a new cold start message, in response to which they will re-register during a new "roll call" in an attempt to register themselves properly (i.e., with different time slots during "roll call") with the reader.

When the reader completes the dialogue for all the cards which registered during a "roll call", it will then once again transmit a cold start message, requesting any unserviced cards to wake up, and thus the process repeats. This enables any new cards and any cards which had collided during the previous "roll call" to re-register themselves during the randomly self-selected time slots of a new "roll call".

It will be understood that a possible subsets of the cold start message could broadcast information to all cards prior to a "roll call", or request immediate feedback for all cards, etc.

It will be appreciated that various other modifications will be apparent to a person of ordinary skill in the art.

What is claimed is:

1. A method for communicating with a plurality of contactless data carriers, comprising:

a base station transmitting a power signal;

a data carrier powering itself up in response to the transmitted power signal, and entering a wait state;

the base station transmitting a first start up signal for waiting data carriers;

the waiting data carriers exiting the wait state in response to the wake up signal and transmitting identity information in a time slot that is randomly self-assigned;

the base station registering the identity information by polling the registered data carriers and initiating dialogue with registered data carriers in an order determined by the random self-assigned time slots of the registered data carriers;

the base station completing dialogue with a first registered data carrier;

the first registered data carrier shutting down for a remaining time of a communication session;

the base station transmitting a second start up signal to initiate dialogue with a next registered data carrier, the base station initiating dialogue with all of the registered data carriers to complete the communication session; and wherein the first and second start up signals are distinguishable, the first start up signal being used to initiate a communication session with any one of the data carriers, the second start up signal being used to continue the communication session with only registered data carriers.

2. The method of claim 1, wherein the step of the base station initiating dialogue with the next registered data carrier includes determining which of the registered data carriers has a next self-assigned time slot to become the next registered data carrier.

3. The method of claim 1, wherein the base station initiates dialogue with all of the registered data carriers to complete the communication session.

4. The method of claim 3, wherein a next communication session is started by the base station transmitting a next wake up signal.

5. The method of claim 1 wherein the step of the base station initiating dialogue with registered data carriers further includes:

the base station resending the identity information of a first data carrier;

the first data carrier recognizing the identity information and sending an acknowledgment message to the base station; and the base station proceeding with carrying out a transaction with the first data carrier upon receipt of the acknowledgment message.

6. The method of claim 5, further comprising:

the first data carrier reassigning itself a new time slot if the acknowledgment message is not received by the base station; and the first data carrier waiting for a new wake up signal from the base station.

7. A contactless data carrier for communication with a base station comprising:

means for receiving a power signal transmitted by the base station;

means for powering up the data carrier in response to receipt of the power signal, and entering a wait state;

means for receiving a first start up signal transmitted by the base station at an initiation of a communication session;

means for exiting the wait state in response to receipt of the first start up signal;

means for determining a randomly self-assigned time slot, and transmitting identity information in the randomly self-assigned time slot;

means for receiving a second start up signal transmitted by the base station during the communication session, said second start up signal being distinguishable from the first start up signal, the first start up signal being used to initiate a communication session with any one of the data carriers and the second start up signal being used to continue communication with only registered data carriers; and means for conducting a dialogue with the base station on receipt of an individually identified message therefrom.

8. The data carrier of claim 7, further comprising:

means for shutting down following the completion of the dialogue from the base station.

9. The data carrier of claim 7, further comprising:

means for recognizing identity information sent back from the base station; and means for transmitting an acknowledgment message to the base station.

10. The data carrier of claim 9, further comprising:

means for reassigning itself a new time slot if the acknowledgment message is not received by the base station.

\* \* \* \* \*